Figure 4:
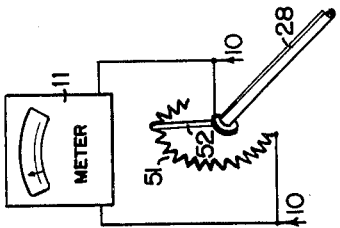

June 21, 1966  H. P. FIELD ET AL  3,256,771
SPOT PHOTOMETER
Filed June 25, 1962

INVENTORS
HAROLD P. FIELD
ROYAL H. AKIN
BY *Harry R. Lubeke*
AGENT

United States Patent Office 3,256,771
Patented June 21, 1966

3,256,771
SPOT PHOTOMETER
Harold P. Field, La Mesa, and Royal H. Akin, San Diego, Calif., assignors to Gamma Scientific, Incorporated, San Diego, Calif., a corporation of Delaware
Filed June 25, 1962, Ser. No. 204,980
3 Claims. (Cl. 88—23)

Our invention relate to luminance analyzers, and particularly to a spot luminance analyzer from which photographic data may be directly obtained.

Photographers of all classifications frequently desire information on the various levels of luminance in a field of view so that, if possible, they can fit the range of such levels to the gamut of their photographic medium. This is equally true in other image forming media, such as television and video tape recording. The term "photography" is thus herein used in its broadest sense.

Photographic information is frequently desired as to the highest luminance in the scene, the lowest luminance in the scene and the relation of the brightness of items of principal interest in the scene, such as human faces.

Such information, however, is of little more than of academic interest unless it can be quickly related to the photographic parameters of the medium employed.

So that this relation can be quickly established we have provided a light-sensitive instrument in which a wide range of sensitivity can be controlled by the rotation of a single knob. One circumferential scale of a photographic data computer is provided on a dial affixed to this knob. This dial is, in turn, surrounded by further dials having scales of related photographic data.

Optically, an image of the field of view is formed by a lens in a manner similar to a camera and the image is focussed upon an aperture plate located in front of a photosensor, such as an electronic photomultiplier tube. Only the light passing through the aperture impinges upon the light-sensitive surface of the photomultiplier tube.

The electrical output of the photomultiplier tube may be additionally amplified by an amplifier. An indicating meter of the usual DeArsonval type is connected to the output of the amplifier. The meter is preferably provided with a scene luminance scale reading in percent, or in decimal markings to allow easy interpretation of the readings. The combination of amplifier and meter constitute electrical means to indicate luminance.

One of the scales on the computer previously described reads in absolute units. When the instrument is adjusted to read 100% for a calibrating brightness (luminance) for the scale reading corresponding to the luminance of the calibrating source, luminance in absolute units is indicated on the scale of the computer dial thus marked. For a 50% deflection of the meter the luminance is one-half that indicated on the computer scale, and so on for other percentage values in the field of view. Other correlated scales of the computer deal with shutter speed, lens opening, film speed and filter factor of the camera employed to photograph the scene involved.

It will be seen that our photometric device makes possible rapid and convenient employment of data obtainable from incremental exploration of the field of view with respect to luminance at the camera location. It is not necessary to enter the scene. The luminance range that can be handled by the photographic system may be as little as 30 to 1 for a television system, or as much as 1,000 to 1 in a photographic system.

It will be understood that once the luminance data have been obtained and the photographic implications thereof determined, the range of luminance may be easily and rapidly adjusted. In studio and stage work the number, luminous flux and orientation of lighting units may be varied at the will of the first cameraman. In exterior scenes lighting control can also be exercised by employing reflectors, scrims and/or by employing strong artificial illumination, as the situation may require.

An object of our invention is to provide an integral luminance analyzer-photographic computer structure.

Another object is to provide such a structure which can be calibrated in absolute photometric units.

Another object is to provide a device which indicates the luminance of objects of particular interest in the field of view as a percentage of the maximum luminance in the field.

Another object is to provide means for simultaneously measuring the maximum luminance in a field of view, determining the exposure constants for the photographic medium, and determining the luminance of other points in the field of view.

Another object is to provide means with which the above-stated measurement and determinations are accomplished by operating one manual sensitivity control.

Other objects will become apparent upon reading the following detailed specification and upon examining the accompanying drawings, in which are set forth by way of illustration and example certain embodiments of our invention.

Figure 2:
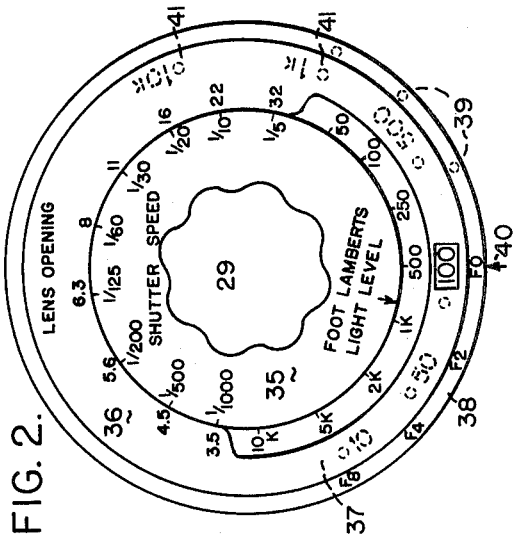
Figure 3:
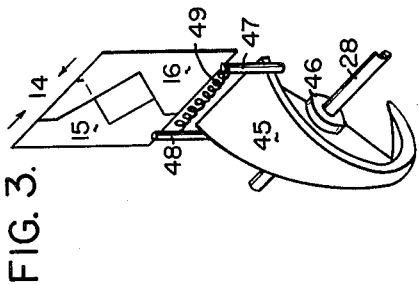
Figure 1:
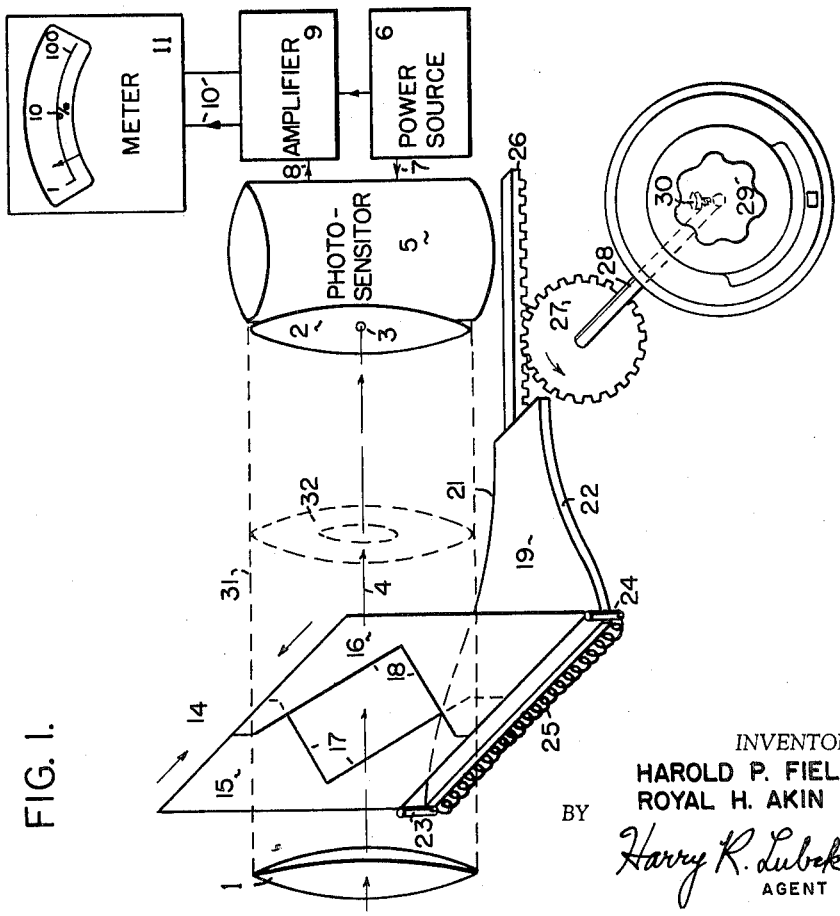

FIG. 1 shows an elevation view of our luminance analyzer with the optical elements thereof in schematic perspective, FIG. 2 shows an enlarged front-face view of the photographic computer assembly, FIG. 3 shows an alternate optical sensitivity control employing a cylindrical cam, and FIG. 4 shows an alternate sensitivity control of electrical nature.

In FIG. 1, numeral 1 indicates an image-forming means, such as a lens, which forms upon an opaque surface 2 an image of the field of view toward which the luminance analyzer is pointed. An aperture 3 is preferably located in the center of this surface. The optical axis of the luminance analyzer is determined by a line through the center of lens 1 and aperture 3, which line is indicated at 4.

It will be understood that of the whole image upon surface 2 only a very small part will pass through aperture 3. It is this functioning that causes the instrument to be a "spot" luminance analyzer, and by the operator pointing it at various directions toward the field of view only the luminance existing in that direction will be indicated. Thus, should the operator point the analyzer at the sky he will obtain a high luminance reading; at the ground, a low luminance reading; and at the faces of actors within the scene, an intermediate reading.

Our instrument is capable of a wide range of embodiments, but in an exemplary one lens 1 has a three inch focal length and aperture 3 a diameter of slightly less than 0.030 inch. This accepts luminous energy from approximately ½° angular measure of the field. A smaller angle of view for the spot is obtained by employing a smaller diameter aperture and/or a longer focal length lens, and vice versa.

Photosensor 5 is disposed optically behind aperture 3, with the light-receiving surface of the photosensor positioned to accept all of the light which passes through the aperture. Known photomultiplier tube 931A is a preferred example of a photosensor for the present purpose, although for applications with sufficient light a cadmium sulphide, selenium or other photoconductor may be used instead.

In any event, suitable electrical energization is provided for photosensor 5 from power source 6 via schematically shown conductor 7. For the photomultiplier this is a relatively high voltage, of the order of a thousand volts. It may be supplied according to the U.S. Patent No. 2,971,433, granted Feb. 14, 1961 to Royal H. Akin. For photoconductors the voltage required is less and can be supplied by batteries or by other known power supply sources.

The electrical output from the photosensor is in the form of a direct current which varies in amplitude depending upon the luminance incident upon it from aperture 3. This electrical output passes via conductor 8 to amplifier 9. With the photomultiplier embodiment the gain of amplifier 9 need not be large, only of the order of one hundred times, since the amplification in the multiplying section of the photomultiplier is many times this amount. With the photoconductor embodiment the amplification required is considerably more than one hundred times, and a direct current amplifier of the usual or of the chopper-conversion to alternating current with subsequent rectification may be employed. With the photomultiplier the whole scheme of multiplier anode supply and amplification of the Akin patent referred to above may be used.

The electrical output of amplifier 9 passes via conductors 10 to indicating meter 11. The latter is typically a direct current instrument of 20 microamperes full scale range. It is provided with a scale reading in terms of 100% for essentially full scale deflection. The scale may be graduated according to a logarithmic law or according to a uniform law depending upon the law of operation at the output of the photosensor and the amplifier. Either may be employed in accordance with the Akin patent. While it is expected that the highest luminance value will be used in surveying any field of view, the additional scale shown above the 100% allows for measurement of subsequently discovered higher luminance values.

We retire again to the optical system of the luminance analyzer and give attention to diaphragm 14. This variable aperture element is located relatively close to lens 1 along optical axis 4 between the lens and image surface 2. The diaphragm is composed of two plates 15 and 16, each having a diamond shaped cut out at adjacent edges to provide an aperture centered on optical axis 4. The edges in plate 15 are identified as 17 and in plate 16 as 18. One plate slides over the other, giving a lap joint. It will be seen that when the plates are far apart, as shown in FIG. 1, the aperture at 17–18 will be large. When the plates come together the aperture becomes smaller and can be made to almost close.

The motion of the plates is controlled by a two surface cam 19; one surface, 21, actuating plate 15 and the second surface 22, actuating plate 16. Normally, the curves of surfaces 21 and 22 are symmetrical with respect to the optical axis of the luminance analyzer. For the usual squared function between lens stops these curves are square functions.

The separation of plates 15 and 16 by surfaces 21 and 22 is accomplished by pins 23 and 24, which are attached to plates 15 and 16 and bear upon surfaces 21 and 22, respectively. Such bearing is assured by spring 25, which is attached to each pin and exerts a force upon them tending to bring the plates 15 and 16 together.

Cam 19 is translated by rack 26, to which it is attached, when gear 27 is rotated. All bearings and slide surfaces supporting this kinematic system have been omitted for sake of clarity, but the disposition and the function of these auxiliaries will be understood by those skilled in the art. Gear 27 is fastened for rotation to shaft 28, to which shaft is fastened knob 29. Set screw 30 allows angular adjustment of the knob to the shaft.

It will be seen that uniform angular rotation of knob 29 will result in uniform translation of rack 26 and cam 19. Since the separation between the two cam surfaces 21 and 22 is a square function with relation to the translational position of the cam it is seen that the optical area opening of the diaphragm plates 15 and 16 varies as the square root of the angle of rotation of knob 29.

Again, although the material and design of this mechanism is subject to wide variation, we prefer to make the cam of nylon and the pins of hardened steel, which two materials slide easily, one over the other.

An enclosure 31 encloses the optical elements and is suitably treated to be non-reflective inside, as by means of a coat of photographic dull black lacquer. In FIG. 1 the enclosure is shown cylindrical for convenience, and dotted so as not to interfere with the more important elements of the invention. We also prefer to employ a baffle 32, to prevent stray light from entering aperture 3 and spuriously affecting photosensor 5. This baffle is a diaphragm of fixed and relatively large aperture with respect to the narrow cone of light actually used; i.e., that which passes through aperture 3. The baffle is placed along optical axis 4, typically half way between diaphragm 14 and surface 2. The baffle is optically black, of course. Enclosure 31 may have a different shape and a larger size, thus to house the kinematic train described and other elements of the luminance analyzer, to make the whole a unitary package. Transistors may be employed in amplifier 9 to promote small size of this element and other steps may be taken to enhance unity and light weight.

The details of the photographic computer surrounding knob 29 are given in FIG. 2. The calibration employed on each dial is determined by the photographic aspects of the camera, the photographic emulsion, etc. of the photographic device which photographs the scene, not particularly the aspects of our luminance analyzer. The calibration shown in FIG. 2 is for the dial on the right side of the instrument, the marks being reversed in direction for the dial on the left side.

Dial, or scale, 35 surrounds knob 29 and is fastened to it. Upon the upper part of the dial in the position shown are inscribed index marks at equal angular (and circumferential) distances, one from the other, which correspond to successively doubled areas of light admitted by diaphragm 14, for instance. The successive marks are marked with essentially double times of exposure to which the shutter of the camera is to be set, as from $\frac{1}{1000}$ to $\frac{1}{5}$ second as shown.

The above index marks coincide with equivalent marks upon surrounding dial 36, upon which the marks are calibrated in lens openings (i.e., the area of the iris of the camera) and these range from $f3.5$ to 32 through the double area range as shown. For the conditions illustrated on the circular computer shown the photographer may employ a shutter speed of $\frac{1}{1000}$ second with a lens opening of $f3.5$, a speed of $\frac{1}{60}$ second with an opening of $f8$, a speed of $\frac{1}{5}$ second with an opening of $f32$, in the now well-known manner of photography.

Also engraved upon dial 35 is a single index mark positioned circumferentially away from the previously described plural index marks. The single index mark is labelled "Foot Lamberts, Light Level." This index correlates with a scale directly below it reading from left to right, "$10k$" to "$50$." This scale is engraved upon the body of the luminance analyzer, or upon a dial that is not affected in circumferential position by any of the photographic scales of the calculator that relate to the camera used to photograph the scene. Naturally, the illumination of the scene is not affected by the speed of the film employed to photograph it, and so on.

In the light level scale "$10k$" indicates a brightness of 10,000 foot lamberts. The "$k$" stands for 1,000, according to known convention. The absolute scale of luminance is used by rotating knob 29 while pointing the luminance analyzer at a desired spot in the field of view, say the spot of maximum luminance, until the reading of meter 11 is 100% (i.e., full scale). The reading noted by the index on dial 35 on the subject scale is then the luminance sought. As has been explained, this relation is calibrated occasionally by employing a known standard of luminance, loosening set screw 30 and rotating knob 29 with respect to shaft 28 slightly until the known luminance reading of the standard is indicated opposite the index at the same time as the meter is reading 100%. The set screw is then tightened.

Dial 36 of the computer is oriented circumferentially according to the photographic emulsion speed of the film employed in the photographing camera at any given time. According to known convention, as the ASA standard, the range of film speeds is appropriately positioned upon a third dial 37 and may run from 10 to 10k. Dial 36 is turned until the film speed involved appears in the window of that dial; as the speed "100" shown there in FIG. 2. The film speed numbers not visible in this window have been dotted-in in FIG. 2 for purposes of explanation, but are not seen upon a real computer assembly.

A dial 38 is rotatable, preferably to a few discrete positions by means of a known ball and detent assembly, which is indicated dotted at 39. This is to include the photographic effects or filters, as may be used on the camera. An index 40 is placed upon stationary enclosure 31 of the luminance analyzer in association with the "F0"–"F8" scale. As known, practical filters are usually made available in full digits of equivalent reduced sensitivity of the photographic emulsion. Accordingly, a "x2" filter requires that the exposure be twice as long as though the filter were not employed. When no filter is employed the operator sets dial 38 to "F0". If a "x2" filter is employed, scale 38 is set at this reading with respect to index 40, and so on. Fractional filter factors can be accommodated by intepolation on this dial.

In order to allow adjustment between dial 38 and dial 37, but to avoid alteration of such adjustment when other dials of the computer may be manipulated, detents 41 are provided, and similarly between dials 37 and 36.

When our luminance analyzer is employed for television purposes the shutter speed dial 35 is calibrated with a single index, or with a very few indexes. For U.S. television the index is circumferentially positioned to be the equivalent of the scanning speed, $\frac{1}{60}$ second. For other field repetition speeds, as $\frac{1}{50}$ second for European television standards, an additional index mark is provided. The film speed scale and window may be given an auxiliary calibration corresponding to the sensitivity of the camera tube (transducer) in the television camera and this may be altered by the operator to compensate for the actual sensitivity of the tube in a given camera although the tubes in several cameras may all be of the same type number. It will be understood that the scale shown on dial 35 may be retained and an auxiliary calibration furnished to the television operator. The "Light Level" scale is absolute and does not change regardless of the application of the instrument, but the other computer scales are largely empirical and calibrations from any set of known facts may be provided.

Certain alternate constructions are possible according to our invention.

In FIG. 3, a cylindrical cam 45 replaces cam 19, rack 26 and gear 27 of FIG. 1. Shaft 28 is fastened to cam 45 at hub 46. It will be noted that cam 45 is merely cam 19 "rolled up" to a semicircle. Followers 47 and 48 and spring 49 are similar to the corresponding elements 23, 24 and 25 in FIG. 1. Diaphragm 14, with plates 15 and 16, is as before.

It will be appreciated that alteration of the sensitivity of our luminance analyzer opto-electronic system can be acomplished by adjustment of the electronic part thereof as well as by the optical part. When such an adjustment control is mechanically coupled to shaft 28, for instance, the same luminance-computer relation is established as has been previously set forth for the optical mode of variation.

In FIG. 4 a variable resistor 51 is provided, having rotational arm 52 connected to shaft 28 to vary the resistance of the element. The variable combination is connected in shunt to meter 11, connecting to the two leads 10, 10 which run between amplifier 9 and meter 11. When the luminance is high shaft 28 will be rotated clockwise to bring the meter indication to 100(%) when the elemental area of the field of view of maximum luminance is measured. When the luminance is low the reverse adjustment will be required to give the full scale reading of 100 upon the meter.

In the embodiment employing the Akin high voltage supply for a photomultiplier tube an adjustment upon that high voltage supply may be coupled to shaft 28 of the computer for adjustment of the photomultiplier amplification by turning knob 29. The cam and diaphragm arrangement is not provided nor attached to shaft 28 in these electronic modifications.

Further, a bucking voltage may be arranged for variation of amplitude by knob 29 and electrically connected in opposition to the output voltage from the photomultiplier for varying the electrical sensitivity of the system as indicated on a logarithmic voltmeter.

In accordance with all of the above teachings it will be appreciated that further modifications may be made in the arrangement, size, proportions and shape of our luminance analyzer, and in the details of electrical circuitry thereof without departing from the scope of our invention.

Having thus fully described our invention and the manner in which it is to be practiced, we claim:

1. A photographic spot-luminance analyzer and computer for measuring and comparing the luminance of isolated local spot regions of limited angular size within a larger field of view, comprising a photosensitor element, an opaque screen disposed adjacent said element and having a centrally-disposed light-transmitting aperture, a lens spaced from said screen and positioned to project thereon a focused image of a substantial portion of a photographic scene within its field of view, the optical axis of said lens passing through said aperture, and the diameter of said aperture being so related to the focal length of said lens that only light rays from a spot region corresponding to a solid angle of the order of not more than one degree of angle can pass through said aperture; a diaphragm comprising two symmetrically movable spring-pressed blades disposed adjacent said lens, said blades being movable laterally of the optical axis to vary the effective aperture of said lens symmetrically with respect to the optical axis, each blade having a cam-follower pin secured thereto; and a cam having a pair of square-root-function contoured cam edges engaging said respective pins for moving said blades correspondingly to vary the effective aperture of said lens, and thereby the photometric sensitivity of said photosensitor without altering its field of view or the direction of its sensing axis; an indicating scale meter connected to register the current output of said photosensitor, and a dial-type luminance computer including a knob connected to operate said cam and including at least one dial bearing a scale of luminance values calibrated consonantly with respect to the scale indications of said meter.

2. The combination in accordance with claim 1, in which said cam comprises a contoured plate mounted for rectilinear movement along a path between said pins.

3. The combination in accordance with claim 1, in which said cam is cylindrical element mounted for rotational movement.

(References on following page)

References Cited by the Examiner

UNITED STATES PATENTS

| | | | |
|---|---|---|---|
| 2,206,086 | 7/1940 | Galyon | 95—64 |
| 2,210,882 | 8/1940 | Carter | 95—64 |
| 2,343,206 | 2/1944 | Rath | 95—10 |
| 2,477,235 | 7/1949 | Broido | 95—10 |
| 2,934,996 | 5/1960 | Muse | 88—23 |
| 3,049,983 | 8/1962 | Schulze | 95—10 X |
| 3,059,555 | 10/1962 | Kromer et al. | 95—10 |
| 3,074,335 | 1/1963 | Graves | 88—61 |
| 3,082,674 | 3/1963 | Bagby | 95—64 |

FOREIGN PATENTS

| | | |
|---|---|---|
| 935,219 | 6/1948 | France. |
| 472,147 | 9/1937 | Great Britain. |

JEWELL H. PEDERSEN, *Primary Examiner.*

W. L. SIKES, *Assistant Examiner.*